(12) United States Patent
Hennrich et al.

(10) Patent No.: US 11,548,641 B2
(45) Date of Patent: Jan. 10, 2023

(54) AIRPLANE SEAT DEVICE

(71) Applicant: RECARO Aircraft Seating GmbH & Co. KG, Schwäbisch Hall (DE)

(72) Inventors: Christoph Hennrich, Schwäbisch Hall (DE); Alfons Stachel, Rosengarten (DE); Sinisa Malekovic, Schwäbisch Hall (DE); Tim Klaus, Schwäbisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 0 days.

(21) Appl. No.: 17/260,881

(22) PCT Filed: Jul. 16, 2019

(86) PCT No.: PCT/EP2019/000217
§ 371 (c)(1),
(2) Date: Jan. 15, 2021

(87) PCT Pub. No.: WO2020/015849
PCT Pub. Date: Jan. 23, 2020

(65) Prior Publication Data
US 2021/0276717 A1    Sep. 9, 2021

(30) Foreign Application Priority Data
Jul. 16, 2018 (DE) .......... 102018117104.8

(51) Int. Cl.
*B64D 11/06* (2006.01)
*B64D 11/00* (2006.01)

(52) U.S. Cl.
CPC .... *B64D 11/0638* (2014.12); *B64D 11/00151* (2014.12)

(58) Field of Classification Search
CPC .................. B64D 11/0638; B64D 11/00151
See application file for complete search history.

(56) References Cited

U.S. PATENT DOCUMENTS

| | | |
|---|---|---|
| 2007/0188004 A1 | 8/2007 | Browne et al. |
| 2009/0218858 A1 | 9/2009 | Lawall et al. |
| 2009/0218859 A1 | 9/2009 | Lawall et al. |
| 2009/0224584 A1 | 9/2009 | Lawall et al. |
| 2009/0224587 A1 | 9/2009 | Lawall et al. |
| 2009/0284059 A1 | 11/2009 | Gupta et al. |

(Continued)

FOREIGN PATENT DOCUMENTS

| | | |
|---|---|---|
| CA | 2 617 626 A1 | 2/2007 |
| DE | 10 2009 047 834 A1 | 4/2010 |

(Continued)

OTHER PUBLICATIONS

German Search Report dated Jul. 10, 2019 issued in corresponding DE patent application, No. 10 2018 117 104.8 (and English Translation).

(Continued)

*Primary Examiner* — Anthony D Barfield
(74) *Attorney, Agent, or Firm* — Posz Law Group, PLC

(57) ABSTRACT

An airplane seat device includes at least one functional unit that is configured at least for a locking, a controlling and/or a movement of at least one airplane seat element, wherein the functional unit includes at least one actuatable shape-memory element.

16 Claims, 6 Drawing Sheets

(56) References Cited

U.S. PATENT DOCUMENTS

Figure 1:
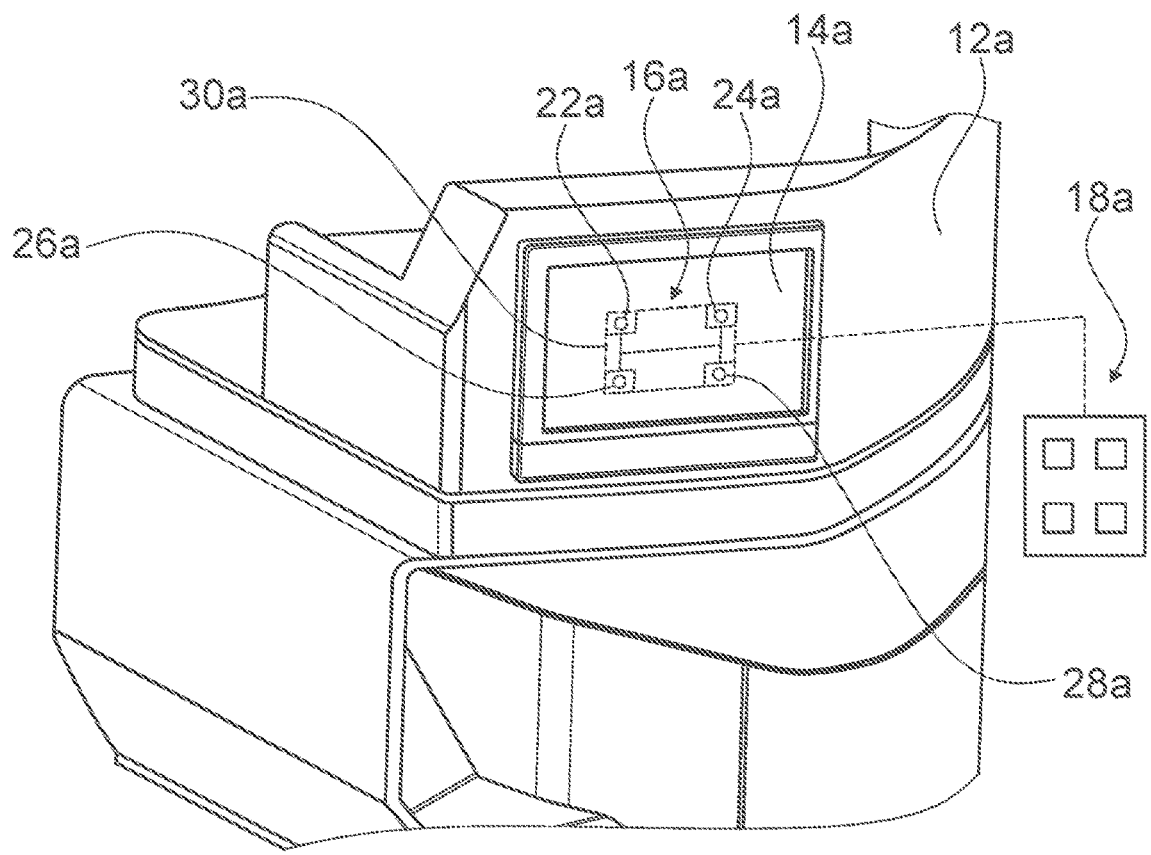

| | | | |
|---|---|---|---|
| 2010/0099346 A1 | 4/2010 | Browne et al. | |
| 2010/0244505 A1* | 9/2010 | Demick | 296/37.16 |
| 2012/0267928 A1 | 10/2012 | Mankame et al. | |
| 2016/0152340 A1 | 6/2016 | Bauer et al. | |
| 2018/0370391 A1* | 12/2018 | Ketels | |
| 2020/0346758 A1 | 11/2020 | Parrilla Calle et al. | |

FOREIGN PATENT DOCUMENTS

| | | |
|---|---|---|
| DE | 10 2010 021 902 A1 | 12/2011 |
| DE | 11 2006 002 942 B4 | 3/2014 |
| DE | 11 2009 000 484 B4 | 11/2016 |
| DE | 11 2009 000 495 B4 | 11/2016 |
| DE | 10 2015 114 382 A1 | 3/2017 |
| DE | 10 2017 107 153 A1 | 10/2018 |
| EP | 2 881 325 A1 | 6/2015 |
| FR | 3034055 A1 | 9/2016 |
| WO | 2007/056640 A2 | 5/2007 |

OTHER PUBLICATIONS

International Search Report of the International Searching Authority dated Sep. 10, 2019 for the corresponding International application No. PCT/EP2019/000217.

International Preliminary Report Chapter I of the International Searching Authority dated Jan. 19, 2021 for the corresponding international application No. PCT/EP2019/000217.

* cited by examiner

AIRPLANE SEAT DEVICE

CROSS REFERENCE TO RELATED APPLICATIONS

This application is a U.S. national stage application of PCT/EP2019/000217 filed on Jul. 16, 2019, which is based on German Patent Application No. 10 2018 117 104.8 filed on Jul. 16, 2018, the contents of which are incorporated herein by reference.

STATE OF THE ART

The invention concerns an airplane seat device according to the preamble of claim 1.

An airplane seat device with at least one functional unit, which is configured at least for a locking, a controlling and/or a movement of at least one airplane seat element, has already been proposed.

The objective of the invention is in particular to provide a generic device having improved characteristics regarding comfort and operability. The objective is achieved according to the invention by the features of patent claim 1 while advantageous implementations and further developments of the invention may be gathered from the subclaims.

ADVANTAGES OF THE INVENTION

The invention is based on an airplane seat device with at least one functional unit that is configured at least for a locking, a controlling and/or a movement of at least one airplane seat element.

It is proposed that the functional unit comprises at least one actuatable shape-memory element. By an "airplane seat device" is in particular a device to be understood which forms at least a portion of an airplane seat or of an airplane seat module. By an "airplane seat" is here in particular a seat to be understood which is configured to be mounted in an airplane cabin of an airplane on a cabin floor and which a passenger can be sit on during a flight. The airplane seat herein comprises a seat bottom and a backrest which is coupled with the seat bottom, wherein the backrest is preferably connected with the seat bottom in a pivotable manner, as a result of which the airplane seat is preferably movable into different functional positions. By an "airplane seat module" is here in particular a module with an airplane seat to be understood, which is configured to be mounted in an airplane cabin, for example a module implemented of an airplane seat with at least one console and an ottoman, which preferentially realize an at least partially separate business-class airplane seat region or first-class airplane seat region. A "functional unit" is in particular to mean a unit of the airplane seat and/or of the airplane seat module which is in particular configured for at least partially controlling, moving or locking an airplane element. Herein a functional unit is preferably a component of the respective airplane seat element, like for example a locking unit, an adjusting unit or a movement unit. "For a controlling" is in particular to mean for carrying out at least part of a function of a functional unit, for example an actuation of a valve via a movement executed by a shape-memory element. "For a locking" is in particular to mean for a form-fit blocking of an element, in particular an airplane seat element, in at least one position, wherein the form-fit blocking is in particular induced by a movement of a shape-memory element. It is herein conceivable that the shape-memory element itself realizes a form-fit connection with a correspondingly implemented element or that the form-fit element moves a locking element, e.g. a pin, into a locking position. By an "airplane seat element" is herein in particular an element of an airplane seat or of an airplane seat module to be understood which can be used for a passenger's use during a flight or can be used by an engineer, for example in maintenance. An airplane seat element is herein embodied, for example, as a screen, as an unfoldable tray table, as a seat locking, or as another element of the airplane seat or of the airplane seat module which is deemed expedient by someone skilled in the art. By an "actuatable shape-memory element" is in particular an element to be understood which is implemented at least partly of a shape-memory material, in particular a shape-memory alloy, which is configured, to change its shape by way of an actuation with a current, wherein the shape-memory element always takes the same position with a same actuation by a current. By a "shape-memory alloy" is herein in particular a metal alloy to be understood which is capable of existing in two different lattice structures, as a result of which an element implemented of a shape-memory alloy is capable, after a considerable deformation due to an impact in particular of heat, to re-deform into its original shaping without further external influence. "Configured" is in particular to mean specifically programmed, designed and/or equipped. By an object being configured for a certain function is in particular to be understood that the object fulfills and/or carries out said certain function in at least one application state and/or operation state. By an implementation according to the invention an especially simple and cost-efficient device for a controlling, locking or movement of an airplane seat element is achievable.

It is further proposed that the functional unit forms at least a portion of a screen adjusting unit. By a "screen adjusting unit" is in particular a unit to be understood which is configured to adjust an orientation of a screen following a user's wishes. This allows implementing a device for an adjustment of a screen in a particularly simple fashion.

Moreover it is proposed that the functional unit comprises at least one adjustment element, which is adjustable at least substantially by the at least one actuatable shape-memory element. By an "adjustment element" is in particular an element to be understood which is adjusted, in particular moved, by a movement of the shape-memory element and is coupled with the airplane seat element for the purpose of thus transferring a movement of the at least one shape-memory element to the airplane seat element. In this way a movement of a shape-memory element is transferable to the corresponding airplane seat element in an especially simple manner.

It is also proposed that the functional unit forms at least a portion of a locking unit. By a "locking unit" is in particular a unit to be understood which, in at least one operation state, locks an airplane seat element in a defined position, preferably a stowage position. This allows implementing an especially advantageous, in particular long-lived, locking unit.

It is further proposed that the functional unit comprises at least one locking element, which is traversable between at least two positions and which is adjustable at least substantially by the at least one actuatable shape-memory element. By a "locking element" is in particular an element to be understood which, in a locking state, comes into form-fit contact with a correspondingly implemented locking element, for the purpose of thus locking the airplane seat element in at least one position, preferably in a stowage or locking position. The locking element is herein preferably embodied as a locking pin or as a locking hook. Principally it is also conceivable that the locking element has a different shape that is deemed expedient by someone skilled in the art. This allows providing a functional unit by means of which an airplane seat element can be locked and unlocked in an especially advantageous and simple manner.

Moreover it is proposed that the at least one actuatable shape-memory element is embodied as a locking element which is configured, in at least one operation state, for blocking and/or locking another element, like in particular a correspondingly implemented locking element. By "the shape-memory element being embodied as a locking element" is in particular to be understood that for a locking of the airplane seat element the shape-memory element is moved in such a way that it is itself in a form-fit contact with a locking element in a locking position. In this way it is possible for the functional unit to be implemented for a locking of an airplane seat element in a particularly simple fashion.

Beyond this it is proposed that the functional unit is embodied at least as a portion of a seat adjustment mechanism. By a "seat adjustment mechanism" is in particular a mechanism to be understood by means of which a seat position of the airplane seat is adjustable between at least one comfort position and a TTL position, in which the airplane seat is oriented in a maximally upright position. By means of the seat adjustment mechanism in particular the backrest and/or the seat bottom can be adjusted relative to a mounting unit of the airplane seat. This enables a particularly easy locking of a seat adjustment mechanism, as a result of which a central locking of all airplane seats in an airplane cabin can be effected in an especially advantageous manner.

It is also proposed that the shape-memory element is configured, in at least one operation state, to activate at least one actuator element. By an "actuator element" is in particular an element to be understood which is, at least in an activated state, capable of exerting a force onto a further element for the purpose of decelerating or initiating in particular a movement, like for example a linear and/or pivoting movement, of an element. This especially advantageously allows using the shape-memory element for a simple actuation of an actuator element.

Moreover it is proposed that the airplane seat device comprises at least one operating unit, via which the at least one shape-memory element is actuatable and which comprises at least one operating element, which is preferentially embodied as a touch-free sensor. By an "operating unit" is at least a unit to be understood which can be operated by a person and via which respective control signals are emitted to an element that is to be controlled. Principally it is conceivable that the operating element is implemented as an electrical or electronical structural component, for example as a switch or as a push button, which when operated outputs a control signal for an actuation of the at least one shape-memory element. By a "touch-free sensor" is herein in particular a sensor to be understood which can be activated without a direct touch by an operator. A touch-free sensor is herein preferably embodied as an infrared sensor, as a motion sensor or as a camera. In this way a particularly simple and intuitive controlling of the airplane seat device is achievable.

It is further proposed that the functional unit is configured for locking the airplane seat element in case of a crash. A "case of a crash" is in particular to mean an overload case. An "overload case" is in particular to mean a situation in which forces act onto an airplane seat, in particular the airplane seat module, which are greater than in a normal operation state, for example during an accident. Preferentially an overload case is in particular to mean a case of a crash, which may for example as well be simulated intentionally in a crash test. By a "crash test" is herein in particular a test to be understood which is carried out in accordance with a standardized crash test procedure on a corresponding test device, and in which impact forces onto an airplane seat or an airplane seat arrangement are recorded, in particular for the purpose of generating data required for an approval of an airplane seat and/or of seat components of an airplane seat. A "normal operation state" is herein in particular to mean an operation state during normal operation of the airplane seat device, in particular in a state when integrated in an airplane and during an operation of the airplane. Preferably, the functional unit "locking an airplane seat element in case of a crash" is in particular to mean that the functional unit locks the airplane seat element in addition to a normal locking. Principally it is also conceivable that in case of a crash the functional unit constitutes the only locking of the airplane seat element. This especially advantageously enables securing of an airplane seat element in case of a crash as well as advantageously reducing possible danger of injuries for a passenger.

The airplane seat device according to the invention is herein not to be limited to the application and implementation described above. In particular, for the purpose of fulfilling a functionality that is described here, the airplane seat device according to the invention may comprise a number of individual elements, structural components and units that differs from a number that is mentioned here.

DRAWINGS

Further advantages will become apparent from the following description of the drawings. In the drawings eight exemplary embodiments of the invention are illustrated. The drawings, the description and the claims contain a plurality of features in combination.

Someone skilled in the art will purposefully also consider the features separately and will find further expedient combinations.

Figure 2:
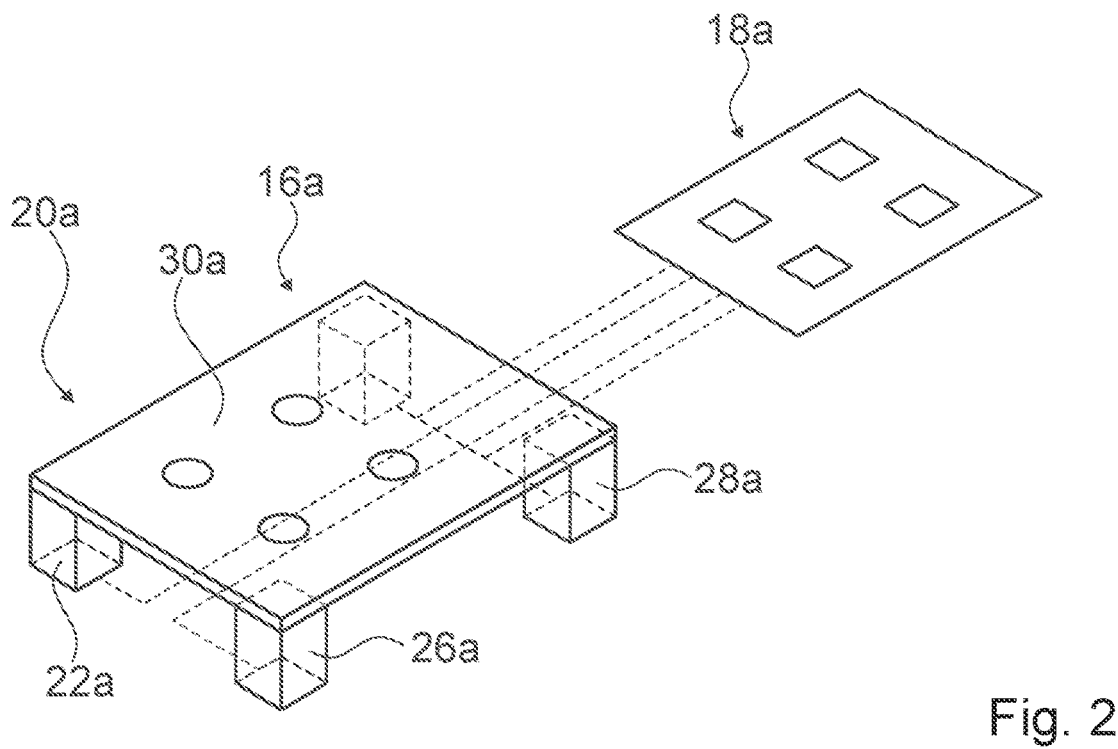
Figure 3:
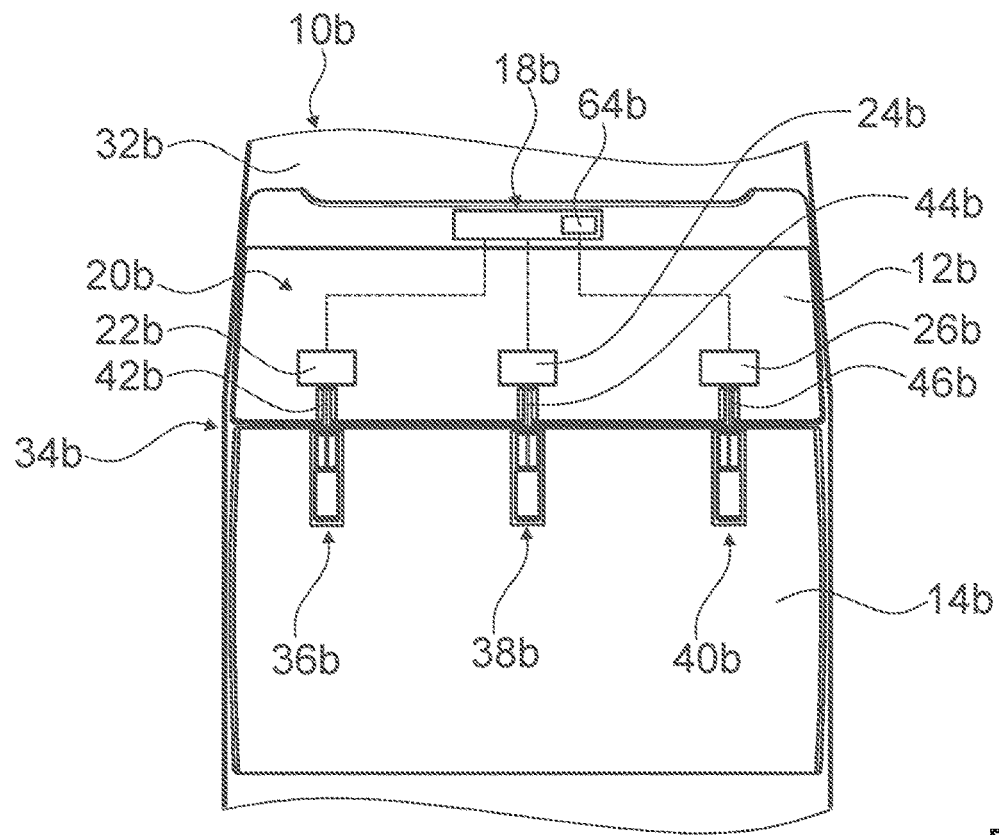
Figure 4:
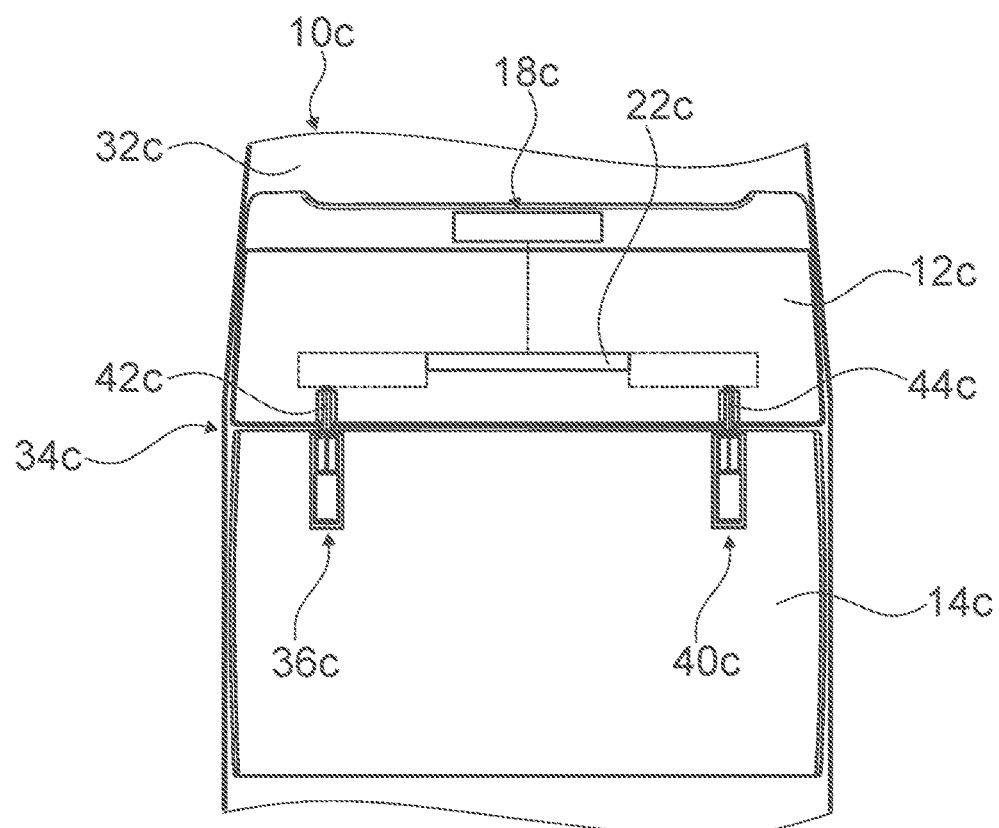
Figure 5:
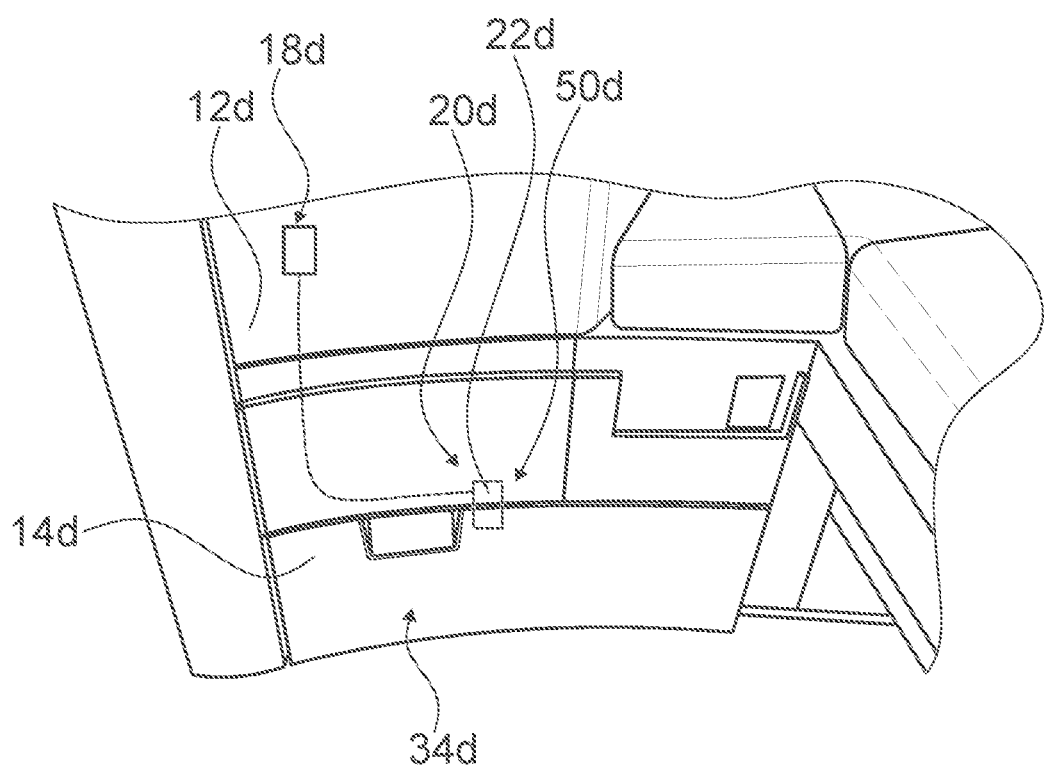
Figure 6:
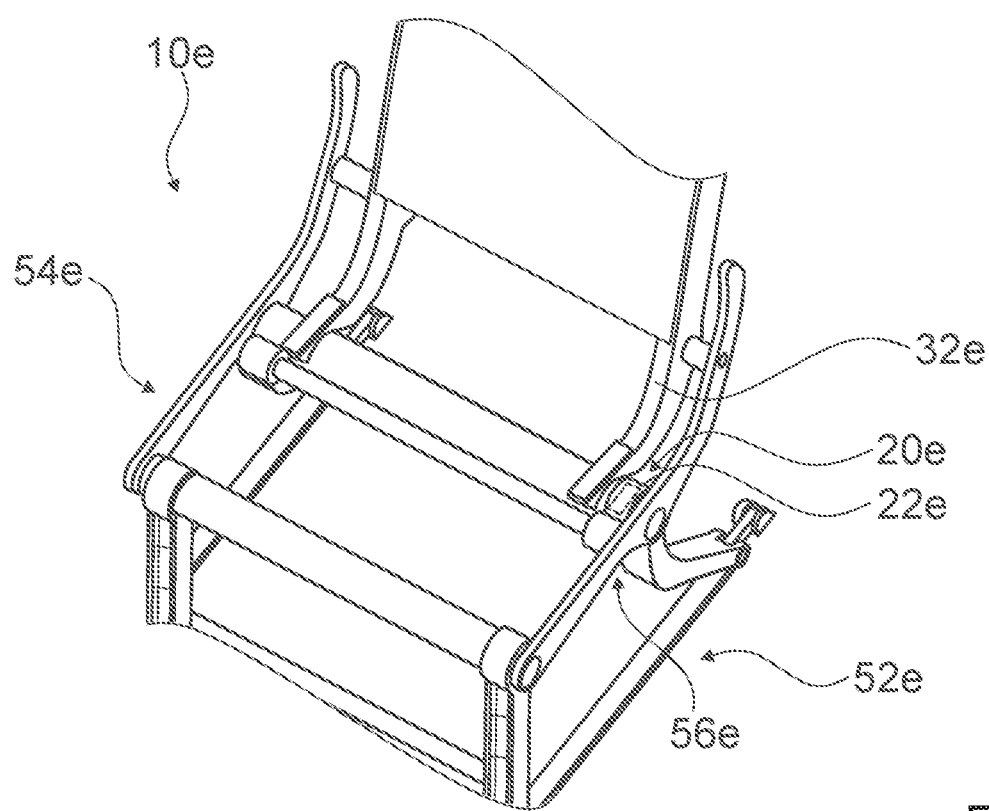
Figure 7:
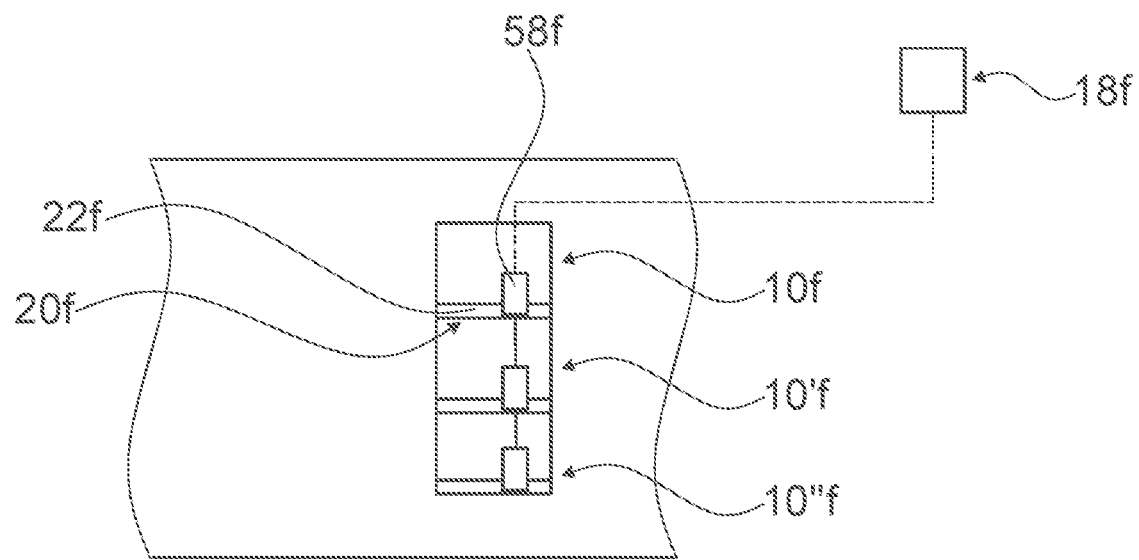
Figure 8:
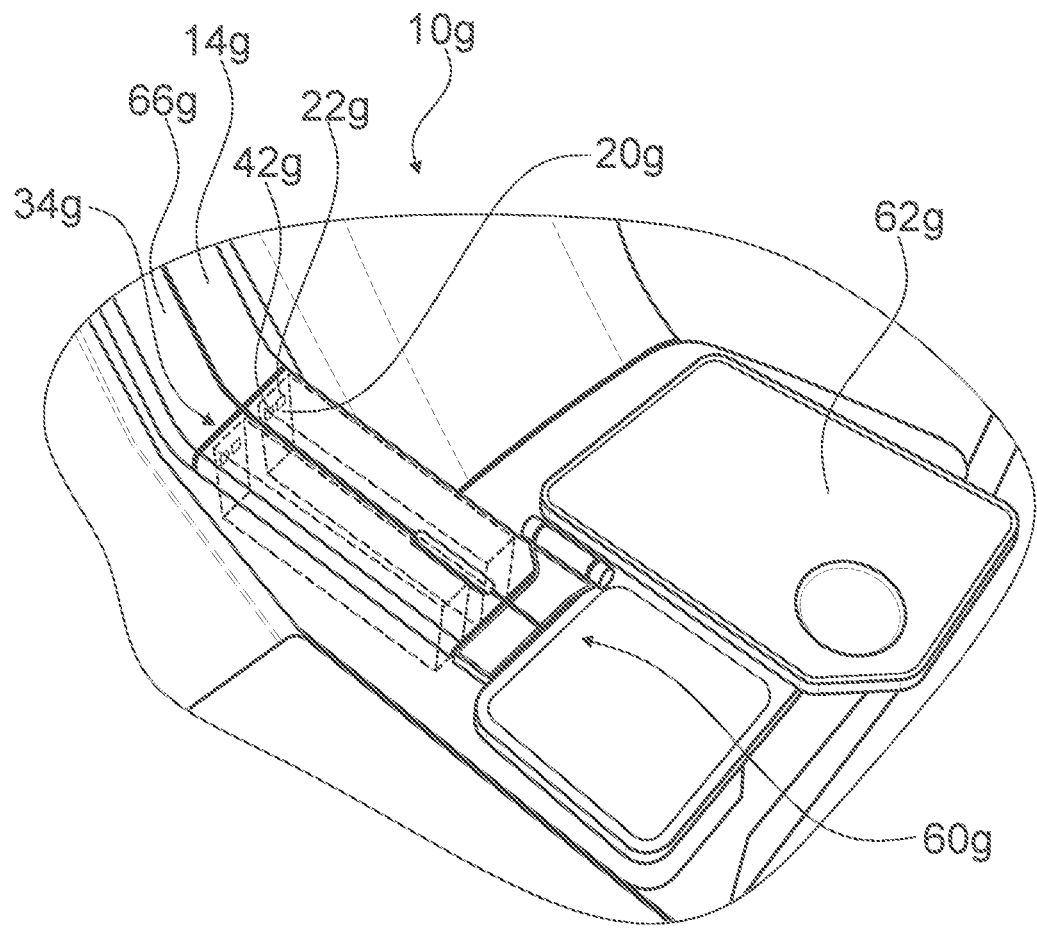
Figure 9:
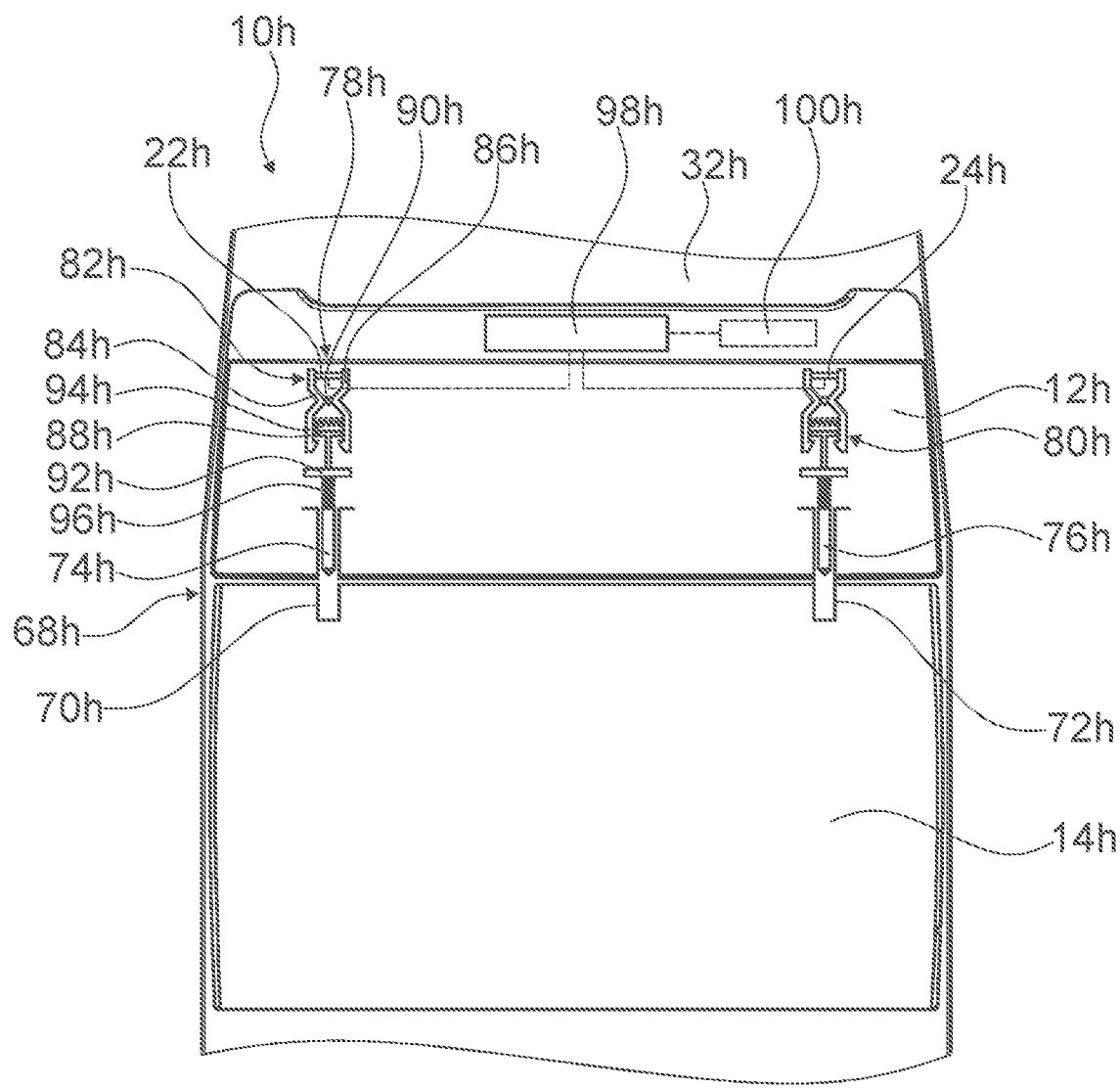
Figure 10:
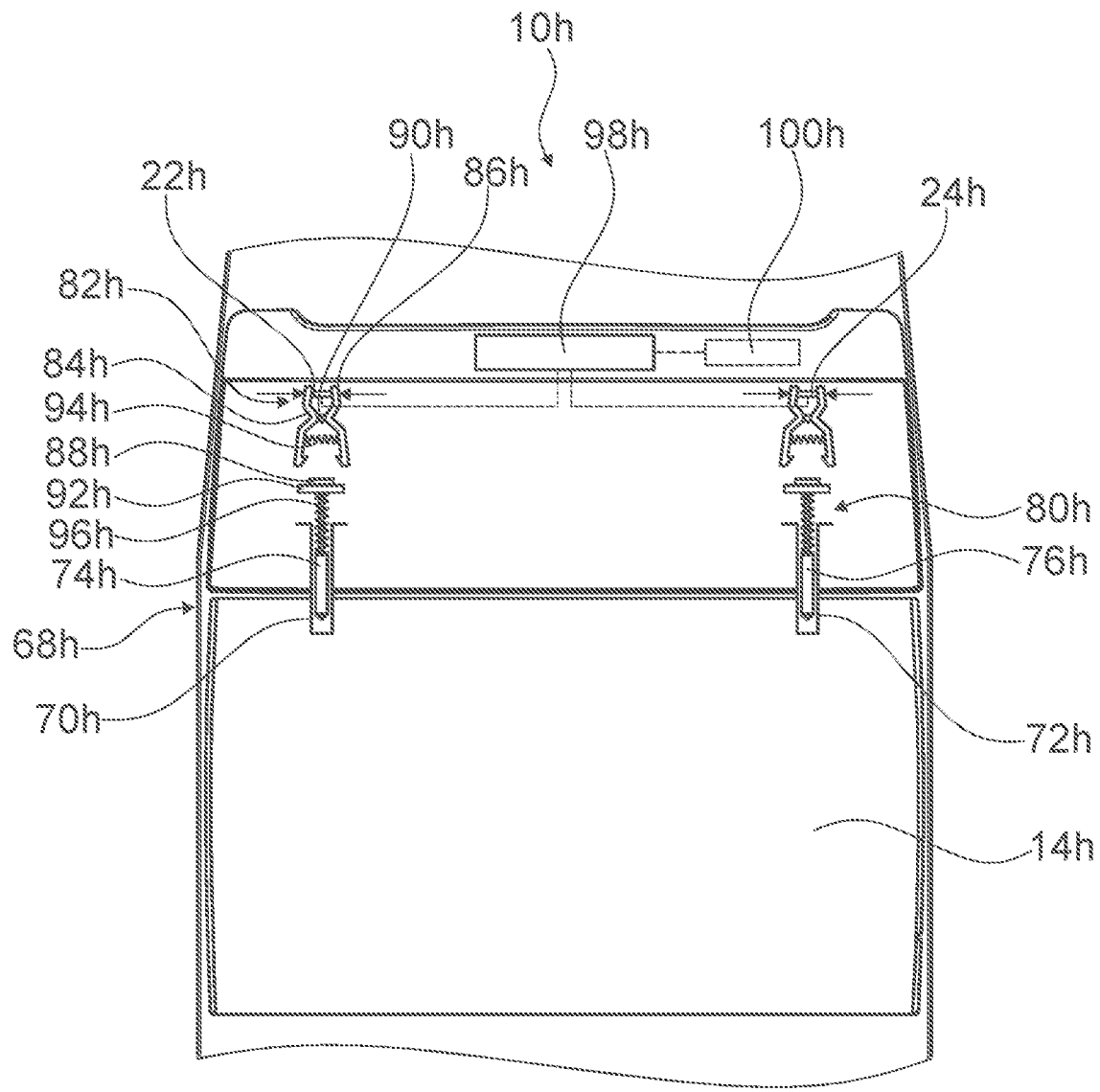

It is shown in:

FIG. 1 a schematic representation of an airplane seat module with an airplane seat device in a first exemplary embodiment, with an airplane seat element that is embodied as a screen, FIG. 2 a schematic view of a screen adjusting unit with a functional unit of the airplane seat device according to the invention, FIG. 3 a schematic representation of an airplane seat module with an airplane seat device in a second exemplary embodiment, with an airplane seat element that is embodied as a table, FIG. 4 a schematic representation of an airplane seat module with an airplane seat device in a third exemplary embodiment, with an airplane seat element that is embodied as a service flap, FIG. 5 a schematic representation of an airplane seat module with an airplane seat device in a fourth exemplary embodiment, FIG. 6 a schematic representation of an airplane seat module with an airplane seat device in a fifth exemplary embodiment, with an airplane seat element that is embodied as an airplane seat locking unit, FIG. 7 a schematic representation of an airplane seat module in a sixth exemplary embodiment, with an airplane seat element that is embodied as an airplane seat locking unit, FIG. 8 a schematic representation of an airplane seat module in a seventh exemplary embodiment, with an airplane seat element that is embodied as a flap, FIG. 9 a schematic representation of an airplane seat module in an eighth exemplary embodiment, with an airplane seat element that is embodied as a tray table, and FIG. 10 a further representation of the airplane seat module in the eighth exemplary embodiment.

DESCRIPTION OF THE EXEMPLARY EMBODIMENTS

FIGS. 1 and 2 show an airplane seat device in a first exemplary embodiment. The airplane seat device is part of a schematically illustrated airplane seat module 10a with an airplane seat. The airplane seat module 10a is implemented as a business-class seat module or as a first-class seat module. The airplane seat module 10a comprises a panel 12a. The panel 12a is implemented as a housing of the airplane seat module 10a. The airplane seat device comprises an airplane seat element 14a, which is embodied as a screen. The airplane seat element 14a embodied as a screen is integrated in or set upon the panel 12a of the airplane seat module 10a. The airplane seat element 14a embodied as a screen is arranged in a region in front of the airplane seat. This enables a passenger situated on the airplane seat to see the airplane seat element 14a that is embodied as a screen. Principally it would also be conceivable that the airplane seat device is part of an airplane seat that is part of an economy-class seat row. It would herein be conceivable that the panel 12a, which the airplane seat element 14a is arranged on, is embodied as a separating wall or as a backrest of an airplane seat.

The airplane seat device comprises a screen adjusting unit 16a. The screen adjusting unit 16a is configured to support the airplane seat element 14a that is embodied as a screen. By means of the screen adjusting unit 16a, the airplane seat element 14a is adjustable relative to the panel 12a, in particular to the airplane seat. By means of the screen adjusting unit 16a it is possible to adjust in particular an orientation, i.e. an inclination, of the airplane seat element 14a relative to a passenger on the airplane seat. This allows adapting an orientation of the airplane seat element 14a to a passenger's eye level and view angle. The screen adjusting unit 16a is configured to be operated by a passenger, thus in particular enabling the passenger to actively carry out an adjustment of the airplane seat element 14a that is embodied as a screen. Principally it would also be conceivable that the airplane seat element 14a is embodied as a different element that is deemed expedient by someone skilled in the art, for example as a tablet holder which is configured to fixate a tablet computer, as a headrest, or as a cup holder.

The airplane seat device comprises an operating unit 18a, via which the screen adjusting unit 16a can be operated. The operating unit 18a comprises one or several operating element/s, which is/are not shown in detail and the operation of which enables an operator, in particular a passenger, to operate the screen adjusting unit 16a for an adjustment of the airplane seat element 14a that is embodied as a screen. Herein it is conceivable that the operating unit 18a comprises only one operating element or a plurality of operating elements for a controlling of the screen adjusting unit 16a. Herein it is conceivable that the operating elements are realized as feelers, as buttons or as touch-sensitive sensors. Principally it would also be conceivable that the operating unit 18a is integrated in an overall operating element of the airplane seat and is, for example, implemented by a touch screen that is mounted at the airplane seat. Principally it is also conceivable that the operating unit 18a is implemented of a personal electronic device, for example a tablet computer or a smartphone, which is coupled with the airplane seat device in a manner that is deemed expedient by someone skilled in the art, in particular via a wireless connection.

The screen adjusting unit 16a comprises a functional unit 20a. The functional unit 20a is configured for a movement of the airplane seat element 14a. The functional unit 20a is configured for a controlling, in particular for an orientation, of the airplane seat element 14a. The functional unit 20a is configured to implement an orientation requirement entered by an operator via the operating unit 18a and to adjust the airplane seat element 14a that is embodied as a screen accordingly. The functional unit 20a comprises four actuatable shape-memory elements 22a, 24a, 26a, 28a. Principally it would also be conceivable for the functional 20a to comprise a different number of shape-memory elements 22a, 24a, 26a, 28a, for example only two, only three, five or more. The shape-memory elements 22a, 24a, 26a, 28a are realized as springs made of a shape-memory alloy. The shape-memory elements 22a, 24a, 26a, 28a are configured to change their length when subjected to a current. The shape-memory elements 22a, 24a, 26a, 28a are separately actuatable via the operating unit. For this purpose, preferably the shape-memory elements 22a, 24a, 26a, 28a are individually cable-connected with the operating unit 18a. The functional unit 20a comprises an adjustment element 30a. The adjustment element 30a has on a first side a connection region for the airplane seat element 14a. In a mounted state the airplane seat element 14a is connected with the adjustment element 30a via the connection region. The adjustment element 30a has a rectangular shape. Principally it is also conceivable that the adjustment element 30a has a different shape, e.g. a round or an oval shape. The shape-memory elements 22a, 24a, 26a, 28a are arranged on a second side of the adjustment element 30a, which is situated opposite the airplane seat element 14a, Respectively one of the shape-memory elements 22a, 24a, 26a, 28a is arranged in a corner region of the rectangular adjustment element 30a. The shape-memory elements 22a, 24a, 26a, 28a are each fixedly connected with the adjustment element 30a with a first side. On a second side the shape-memory elements 22a, 24a, 26a, 28a are supported on the panel 12a via a structure that is not shown in detail. Due to the support on the panel 12a, a change in length of individual shape-memory elements 22a, 24a, 26a, 28a enables achieving a tilting of the adjustment element 30a, and thus also of the airplane seat element 14a that is connected thereto, relative to the panel 12a. Differing actuation and thus differing lengths of the shape-memory elements 22a, 24a, 26a, 28a enable an adjustment of the inclination of the adjustment element 30a—and thus of the airplane seat element 14a that is connected thereto—relative to the panel 12a.

FIGS. 3 to 10 show seven further exemplary embodiments of the invention. The following description and the drawings are limited essentially to the differences between the exemplary embodiments, wherein regarding identically denominated structural components, in particular regarding structural components having the same reference numerals, the drawings and/or the description of the other exemplary embodiments, in particular of FIGS. 1 and 2, may principally also be referred to. To distinguish between the exemplary embodiments the letter a has been added to the reference numerals of the exemplary embodiment of FIGS. 1 and 2. In the exemplary embodiments of FIGS. 3 to 10 the letter a has been substituted by the letters b to h.

FIG. 3 shows an airplane seat device in a second exemplary embodiment. The airplane seat device 10b is part of a schematically illustrated airplane seat. The airplane seat comprises a backrest 32b. The backrest 32b comprises a panel 12b, which forms a rear side of the backrest 32b. The airplane seat further comprises an airplane seat element 14b, which is embodied as a tray table. The airplane seat element 14b embodied as a tray table is supported on the backrest 32b such that it is pivotable at least between a stowage position and a usage position. In the stowage position the airplane seat element 14b is folded back to the backrest 32b. In a folded-back state an upper edge of the airplane seat element 14b embodied as a tray table is preferably adjacent to a projection of the panel 12b of the backrest 32b. Herein it is in particular conceivable that the airplane seat element 14b that is embodied as a tray table must be folded together for a transfer into the stowage position, with the edge that is the upper edge in the folded-back state being formed by edges of two tray table halves which are pivotable relative to each other.

The airplane seat device comprises a locking unit 34b. The locking unit 34b is configured for locking the airplane seat element 14b on the backrest 32b in the stowage position. In a region of the upper edge of the airplane seat element 14b that is embodied as a tray table, the locking unit 34b comprises three locking elements 36b, 38b, 40b. The locking elements 36b, 38b, 40b are embodied as locking receptacles. The locking elements 36b, 38b, 40b are configured in such a way that, for a locking of the airplane seat element 14b in the stowage position, form-fit elements engage into them in a form-fit manner. The locking unit 34b comprises a functional unit 20b. The functional unit 20b is configured for locking and unlocking the airplane seat element 14b in the stowage position. The functional unit 20b comprises three locking elements 42b, 44b, 46b, which are traversable between two positions. The locking elements 42b, 44b, 46b are arranged in the backrest 32b, in particular in the panel 12b of the backrest 32b. The locking elements 42b, 44b, 46b are arranged in the panel 12b in such a way that they are linearly displaceable. In an unlocking position the locking elements 42b, 44b, 46b are retracted in the panel 12b. In a locking position the locking elements 42b, 44b, 46b protrude from the panel 12b and are herein in particular arranged such that they engage into the locking elements 36b, 38b, 40b, which are arranged in the airplane seat element 14b, if the airplane seat element 14b is arranged in its stowage position. Principally it is also conceivable that the functional unit 20b comprises a different number of locking elements 42b, 44b, 46b, for example only a central locking element 44b or only two outward-arranged locking elements 42b, 46b. The locking unit 34b would then comprise a corresponding number of correspondingly embodied locking elements 36b, 38b, 40b embodied as locking receptacles.

The functional unit 20b comprises three shape-memory elements 22b, 24b, 26b. The shape-memory elements 22b, 24b, 26b are configured for a locking of the airplane seat element 14b that is embodied as a tray table. The shape-memory elements 22b, 24b, 26b are configured for a controlling of the locking elements 42b, 44b, 46b of the functional unit 20b. The shape-memory elements 22b, 24b, 26b are configured for an adjustment of the locking elements 42b, 44b, 46b between their locking position and their unlocking position. For this purpose, the shape-memory elements 22b, 24b, 26b are fixedly connected with the locking elements 42b, 44b, 46b. The shape-memory elements 22b, 24b, 26b have two states. In a first state the shape-memory elements 22b, 24b, 26b adjust the locking elements 42b, 44b, 46b into their unlocking position. In a second state the shape-memory elements 22b, 24b, 26b adjust the locking elements 42b, 44b, 46b into their locking position. Principally it would also be conceivable that for a controlling the functional unit 20b comprises only one shape-memory element 22b for several locking elements 42b, 44b, 46b.

The airplane seat device comprises an operating unit 18b, via which the locking unit 34b can be operated. The operating unit 18b comprises an operating element 64b, an operation of which enables an operator, in particular a passenger, to operate the locking unit 34b for a locking of the airplane seat element 14b that is embodied as a tray table. By an operation of the operating unit 18b, the shape-memory elements 22b, 24b, 26b of the functional unit 20b are actuated. Herein the shape-memory elements 22b, 24b, 26b are respectively actuated in such a way that they are adjusted between their two states. The operating element 64b is embodied as a touch-free sensor. Principally it would also be conceivable for the operating element 64b to be embodied as a feeler, as a switch, or as another electrical or electronical operating element. The operating element 64b that is embodied as a touch-free sensor is capable of sensing certain movements of a passenger and of outputting a corresponding signal for a controlling of the shape-memory elements 22b, 24b, 26b. The sensor is realized as a motion sensor. Principally it is also conceivable that the sensor is realized as an infrared sensor. Herein it is in particular conceivable that a sensor, for example, recognizes a passenger's manual gesture, in particular in the region of the airplane seat element 14b that is embodied as a tray table, and thus in particular initiates an unlocking of the airplane seat element 14b via a corresponding actuation of the shape-memory elements 22b, 24b, 26b. In case of a non-supply of current or of another disorder, the locking unit 34b is secured in the locked state, in which it locks the airplane seat element 14b on the backrest 32b in the stowage position. Herein, in case of a non-supply of current or of another electrical or electronical disorder, the airplane seat element 14b can always be adjusted from the usage position into its stowage position on the backrest 32b and can in particular also be locked there. Principally it is also conceivable that the locking unit 34b additionally comprises a mechanical operating member, like for example a Bowden cable or a lever, by means of which the locking unit 34b can be operated manually by a passenger, also in case of a non-supply of current. The operating member is herein preferably arranged under cover, such that is in particular intended to be operated by flight staff.

The airplane seat device comprises a securing device, which is not shown in detail. The securing device is configured for locking the airplane seat element 14b embodied as a tray table in the stowage position if a locking signal is outputted which can be triggered by flight staff. The locking signal is herein in particular implemented as a TTL signal (taxi, take-off, landing signal), which is triggered by the flight staff in safety-relevant flight phases, like in particular at the start, in case of turbulences and when landing, and in which the tray tables should be in a stowage position and the airplane seats should be oriented in an upright TTL position. Preferentially the securing device is in particular configured for blocking all airplane seat elements 14b, which are embodied as tray tables and are arranged in the airplane cabin, in their locking position. Preferably, for a locking of the airplane seat element 14b embodied as a tray table, the securing device is configured to prevent an actuation of the respective shape-memory elements 22b, 24b, 26b.

FIG. 4 shows an airplane seat device in a third exemplary embodiment. The airplane seat device is part of a schematically illustrated airplane seat. The airplane seat comprises a backrest 32c. The backrest 32c comprises a panel 12c, which forms a rear side of the backrest 32c. The airplane seat further comprises an airplane seat element 14c that is embodied as a tray table. The airplane seat element 14c embodied as a tray table is supported on the backrest 32c in such a way that it is pivotable at least between a stowage position and a usage position. In the stowage position the airplane seat element 14c is folded back to the backrest 32c. In a folded-back state an upper edge of the airplane seat element 14c embodied as a tray table is preferably adjacent to a projection of the panel 12c of the backrest 32c.

The airplane seat device comprises a locking unit 34c. The locking unit 34c is configured for locking the airplane seat element 14c on the backrest 32c in the stowage position. In a region of the upper edge of the airplane seat element 14c that is embodied as a tray table, the locking unit 34c comprises two locking elements 36c, 38c. The locking elements 36c, 38c are configured as locking receptacles. The locking elements 36c, 38c are configured in such a way that, for a locking of the airplane seat element 14c in the stowage position, form-fit elements engage into the locking elements 36c, 38c in a form-fit manner. The locking unit 34c comprises a functional unit 20c. The functional unit 20c is configured for a locking and an unlocking of the airplane seat element 14c in the stowage position. The functional unit 20c comprises two locking elements 42c, 44c, which are traversable between two positions. The locking elements 42c, 44c are arranged in the backrest 32c, in particular in the panel 12c of the backrest 32c. The locking elements 42c, 44c are arranged in the panel 12c such that they are linearly displaceable. In an unlocking position the locking elements 42c, 44c are retracted in the panel 12c. In a locking position the locking elements 42c, 44c protrude from the panel 12c and are herein in particular arranged such that they engage into the locking elements 36c, 38c, which are arranged in the airplane seat element 14c, if the airplane seat element 14c is arranged in its stowage position.

In contrast to the preceding exemplary embodiment, the functional unit 20c comprises only one shape-memory element 22c. The shape-memory element 22c is configured for a locking of the airplane seat element 14c that is embodied as a tray table. The shape-memory element 22c is configured for a controlling of the two locking elements 42c, 44c of the functional unit 20c. The shape-memory element 22c is configured for adjusting the locking elements 42c, 44c between their locking position and their unlocking position. The shape-memory element 22c is implemented as a shape-memory wire. The shape-memory element 22c that is implemented as a shape-memory wire is configured, between its actuated state and its non-actuated state, to have different longitudinal extensions. In the activated state the shape-memory element 22c contracts and has a shorter longitudinal extension than in the non-actuated state. The two locking elements 42c, 44c, which are arranged on opposite sides of the shape-memory element 22c, are respectively connected to ends of the shape-memory element 22c. When the shape-memory element 22c contracts in the actuated state, the locking elements 42c, 44c are pulled into an interior of the panel 12c, into their unlocking position, via a connection that is shown only schematically. Principally it is also conceivable that, for as controlling of the several locking elements 42c, 44c, the one shape-memory element 22c is realized as a different shape-memory element 22c. The airplane seat device comprises an operating unit 18c, via which the locking unit 34c can be operated. The operating unit 18c is herein implemented substantially in the same way as in the preceding exemplary embodiment. Principally it would here also be conceivable that, regarding an arrangement of the components of the locking unit 34c in the airplane seat element 14c and in the backrest 32c, the locking unit 34c is implemented mirror-symmetrically to the embodiment described above. Herein it is in particular conceivable that the functional unit 20c is arranged with its locking elements 42c, 44c in particular in the airplane seat element 14c. The correspondingly implemented locking elements 36c, 38c of the locking unit 34c would then be arranged accordingly in the backrest 32c.

FIG. 5 shows an airplane seat device in a fourth exemplary embodiment. The airplane seat device is part of a schematically illustrated airplane seat module 10d with an airplane seat. The airplane seat module 10d is implemented as a business-class seat module or as a first-class seat module. The airplane seat module 10d comprises a panel 12d. A service region is integrated in the panel 12d. For example, different electrical or electronical components for a controlling of the airplane seat are arranged in the service region. The service region is accessible via a service opening 50d in the panel 12d. The airplane seat device comprises an airplane seat element 14d, which is embodied as a service flap and is configured for an operationally secure closing of the service opening 50d during normal operation. The airplane seat element 14d embodied as a service flap is implemented as a substantially flat plate. The airplane seat device comprises a locking unit 34d. The locking unit 34d is configured for a locking of the airplane seat element 14d. The locking unit 34d comprises a functional unit 20d. The functional unit 20d is configured for a locking of the airplane seat element 14d. The functional unit 20d comprises an actuatable shape-memory element 22d. The actuatable shape-memory element 22d is implemented as a locking element. The shape-memory element 22d is adjustable between two states. Herein the shape-memory element 22d has different extensions and/or shapes in its two different states. The shape-memory element 22d is connected with the panel 12d. Herein the shape-memory element 22d is arranged in the region of the service opening 50d. In a locked state the shape-memory element 22d is capable of securing the airplane seat element 14d that is embodied as a service flap in the region of the service opening 50d in a form-fit manner, such that the airplane seat element 14d securely closes the service opening 50d. For this purpose, the airplane seat element 14d comprises a corresponding locking element 36d, which is locked by the actuatable shape-memory element 22d that is implemented as a locking element. In an unlocked state of the shape-memory element 22d, the airplane seat element 14d embodied as a service flap can be removed from the service opening 50d and can be re-inserted into said service opening 50d. For an operation of the functional unit 20d, in particular of the shape-memory element 22d, the airplane seat device comprises an operating unit 18d. The operating unit 18d comprises a hidden operating element, which is preferably accessible for maintenance staff only, and by means of which the shape-memory element 22d can be adjusted between its two states. This enables a locking an unlocking of the airplane seat element 14d that is embodied as a service flap by an operation of the operating unit 18d.

Principally it would also be conceivable that the airplane seat element 14*d* that is embodied as a service flap closes a service opening 50*d* in an airplane side wall or in a backrest 32*d* of an airplane seat.

FIG. 6 shows an airplane seat device in a fifth exemplary embodiment. The airplane seat device is part of a schematically illustrated airplane seat 10*e*. The airplane seat 10*e* comprises a mounting unit 52*e*. By means of the mounting unit 52*e*, the airplane seat 10*e* can be mounted on a cabin floor. The airplane seat 10*e* comprises a backrest 32*e* and a seat bottom 54*e*. The seat bottom 54*e* and the backrest 32*e* are adjustable between a comfort position and a TTL position. In the TTL position the backrest 32*e* is oriented essentially vertically. In the comfort position the backrest 32*e* is inclined rearwards. The airplane seat device comprises an airplane seat element 14*e*, which is implemented as an actuator element 56*e* and is configured for blocking the backrest 32*e* and the seat bottom 54*e* in the TTL position, in the comfort position and in any intermediate positions. The actuator element 56*e* is embodied as a wrap spring brake. The actuator element 56*e* that is embodied as wrap spring brake is wrapped around a transverse tube of the mounting unit 52*e*. In a closed state the actuator element 56*e* locks the backrest 32*e* relative to the mounting unit 52*e*. In an open state the actuator element 56*e* releases a movement of the backrest 32*e* relative to the mounting unit 52*e*.

For an actuation of the actuator element 56*e*, the airplane seat device comprises a functional unit 20*e*. The functional unit 20*e* comprises a shape-memory element 22*e*. The shape-memory element 22*e* is coupled with the actuator element 56*e*. The shape-memory element 22*e* is configured to adjust the actuator element 56*e* between its closed state and its open state. Thus an adjustment of the backrest 32*e* and/or of the seat bottom 54*e* can be released or blocked by the shape-memory element 22*e*. In an actuated state of the shape-memory element 22*e*, the shape-memory element 22*e* activates the actuator element 56*e* and transfers it into its open state. As a result, a backrest adjustment is released. In a non-actuated state, the shape-memory element 22*e* does not activate the actuator element 56*e*, thus keeping it in its closed state. As a result, a backrest adjustment is locked.

Principally it is also conceivable that the airplane seat element 14*e* embodied as an actuator element 56*e* is implemented as an activatable gas compression spring operating a mechanism for an adjustment of the backrest 32*e*. The shape-memory element 22*e* could herein be embodied as a shape-memory wire, which would activate the actuator element 56*e* embodied as a gas compression spring, instead of a Bowden cable.

FIG. 7 schematically illustrates an airplane seat device in a sixth exemplary embodiment. The airplane seat device comprises an airplane cabin which a plurality of airplane seat rows are arranged in. The airplane seat device comprises a plurality of airplane seats 10*f*, 10'*f*, 10"*f*, only three of which are exemplarily shown schematically. The airplane seats 10*f*, 10'*f*, 10"*f* are respectively adjustable between a comfort position and a TTL position. The airplane seats 10*f*, 10'*f*, 10"*f* respectively comprise an airplane seat element 14*f*, which is embodied as an airplane seat locking unit and is configured to respectively lock the airplane seats 10*f*, 10'*f*, 10"*f* in a TTL position. The airplane seat device comprises one functional unit 20*f* for each of the airplane seats. Each of the functional units 20*f* comprises a locking element 58*f*, which is capable of locking the respective airplane seat 10*f*, 10'*f*, 10"*f* in its TTL position. The functional units 201 respectively comprise a shape-memory element 22*f*, which is configured for operating the airplane seat element 14*f* that is embodied as an airplane seat locking unit. In an actuated state the shape-memory elements 22*f* activate the respective locking elements 58*f*, such that these block the respective airplane seat 10*f*, 10'*f*, 10"*f* in the TTL position. The airplane seat device comprises an operating unit 28*f*, via which all functional units 20*f* of all airplane seats 10*f*, 10'*f*, 10"*f* can be operated simultaneously. The operating unit 18*f* is implemented as a central operating unit 18*f*, which can be operated by flight staff only. The operating unit 18*f* enables a flight staff to centrally block or release all airplane seats 10*f*, 10'*f*, 10"*f* in an airplane cabin in their TTL position.

FIG. 8 shows an airplane seat device in a seventh exemplary embodiment. The airplane seat device is part of a schematically illustrated airplane seat 10*g*. The airplane seat 10*g* is embodied as a front-row seat. The airplane seat 10*g* comprises an armrest 60*g*. Underneath the armrest 60*g* a stowage space 66*g* is arranged, which is not shown in detail. The airplane seat comprises a tray table 62*g*. The tray table 62*g* is configured to be arranged in a stowage position in the stowage space 66*g* underneath the armrest 60*g*. The airplane seat 10*g* comprises a support mechanism, which is not shown in detail and by means of which the tray table 62*g* can be adjusted between the stowage position in the stowage space 66*g* and a usage position in front of a sitting surface of the airplane seat. The airplane seat device comprises an airplane seat element 14*g*. The airplane seat element 14*g* is embodied as a flap, which makes the stowage space 66*g* underneath the armrest 60*g* closable. In an open state of the airplane seat element 14*g* that is embodied as a flap, it is possible to remove the tray table 62*g* from the stowage space 66*g*, respectively to move the tray table 62*g* into the stowage space 66*g*. In a closed state of the airplane seat element 14*g* that is embodied as a flap, the tray table is securely stowed in its stowage position.

The airplane seat device comprises a locking unit 34*g*. The locking unit 34*g* is configured for locking the airplane seat element 14*g* in its closed position. The functional unit 20*g* is configured for a locking and unlocking of the airplane seat element 14*g* embodied as a flap in the closed state. The locking unit 34*g* is in particular configured for locking the airplane seat element 14*g* embodied as a flap in the closed state if a blocking signal is outputted, which is triggerable by a flight staff. The blocking signal is herein in particular implemented as a TTL signal (taxi, take-off, landing signal), which is triggered by the flight staff in safety-relevant flight phases, like in particular at the start, in case of turbulences and when landing, in which the tray tables should be in the stowage position and the airplane seats should be oriented in an upright TTL position. The locking unit 34*g* has a functional unit 20*g* comprising a locking element 42*g*. The locking element 42*g* is configured, in a locked state, to couple the airplane seat element 14*g* embodied as a flap with a locking element of the locking unit 34*g*, which is implemented by the armrest 60*g*, in a form-fit manner. For a controlling of the locking element 42*g*, the functional unit 20*g* comprises a shape-memory element 22*g*. For an actuation of the functional unit 20*g*, in particular of the shape-memory element 22*g*, the airplane seat device comprises an operating unit, which is not shown in detail and which is centrally actuatable by a flight staff.

Principally it would also be conceivable that the airplane seat element 14*g* that is to be locked is embodied as a privacy divider supported in an armrest, as an overhead bin, or as a backrest insert.

FIGS. 9 and 10 show an airplane seat device in an eighth exemplary embodiment. The airplane seat device is part of a schematically illustrated airplane seat. The airplane seat comprises a backrest 32h. The backrest 32h comprises a panel 12h, which forms a rear side of the backrest 32h. The airplane seat further comprises an airplane seat element 14h, which is embodied as a tray table. The airplane seat element 14h embodied as a tray table is supported on the backrest 32h in such a way that it is pivotable at least between a stowage position and a usage position. In the stowage position the airplane seat element 14h is folded back to the backrest 32h. In a folded-back state an upper edge of the airplane seat element 14h embodied as a tray table is preferably adjacent to a projection of the panel 12h of the backrest 32h. It is herein in particular conceivable that the airplane seat element 14h that is embodied as a tray table must be folded together for a transfer into the stowage position, with the edge that is the upper edge in the folded-back state being formed by edges of two tray table halves which are arranged such that they are pivotable relative to each other.

The airplane seat device comprises a locking unit 68h. The locking unit 68h is in particular implemented as a crash locking unit. The locking unit 68h is configured to lock and secure the airplane seat element 14h in its stowage position in case of a crash. The locking unit 68h embodied as a crash locking unit is in particular configured to provide, in case of a crash, an additional locking in addition to a normal locking of the airplane seat element. The locking unit 68h embodied as a crash locking unit is configured, in case of a crash, for an additional securing of the airplane seat element 14h that is embodied as a tray table. The additional securing is in particular to prevent an unintended folding out of the airplane seat element 14h that is embodied as a tray table, thus in particular reducing a risk of injury for a passenger. While in the following only a locking of an aircraft seat element 14h that is embodied as a tray table will be described, the system is also conceivable for a locking of other airplane seat elements, like in particular for a locking of an airplane seat element embodied as a leg rest, or of an airplane seat element embodied as a seat bottom extension.

In the region of the upper edge of the airplane seat element 14h that is embodied as a tray table, the locking unit 68h comprises two locking elements 70h, 72h. The locking elements 70h, 72h are implemented as locking receptacles. The locking elements 70h, 72h are configured in such a way that, for a locking of the airplane seat element 14h in case of a crash, the airplane seat element 14h being arranged in its stowage position, form-fit elements engage into the locking elements 70h, 72h in a form-fit manner.

Principally it is also conceivable for the locking elements 70h, 72h to be arranged on the airplane seat element 14h that is embodied as a tray table in other positions, for example in particular in side regions or at a lower edge.

The locking unit 68h comprises a functional unit 20h. The functional unit 20h is in particular configured for an additional locking of the airplane seat element 14h in the stowage position in case of a crash. The functional unit 20h comprises two locking elements 74h, 76h, which are adjustable between two positions. The locking elements 74h, 76h are arranged in the backrest 32h, in particular in the panel 12h of the backrest 32h. The locking elements 74h, 76h are arranged in the panel 12h in such a way that they are linearly displaceable. In an unlocking position the locking elements 74h, 76h are retracted in the panel 12h. In a locking position the locking elements 74h, 76h protrude from the panel 12h and are herein in particular arranged such that they engage into the locking elements 70h, 72h, which are arranged in the airplane seat element 14h, when the airplane seat element 14h is arranged in its stowage position. Principally it is also conceivable that the functional unit 20h comprises a different number of locking elements 74h, 76h. The locking unit 68h would then comprise a corresponding number of correspondingly embodied locking elements 70h, 72h embodied as locking receptacles.

The functional unit 20h comprises a holding unit 78h, 80h for each of the locking elements 74h, 76h. The two holding units 78h, 80h are implemented substantially identically, and therefore only the one holding unit 78h will be described in detail in the following. The holding unit 78h comprises a holding element 82h. The holding element 82h is configured to hold the locking element 74h in its unlocking position in a normal operation state. The holding element 82h comprises two holding arms 84h, 86h, which are pivotable relative to one another. The holding arms 84h, 86h are connected to one another in a scissor-wise articulated manner. The holding arms 84h, 86h are pivotally connected to one another via a bearing point 90h, which is arranged between first, lower ends of the holding arms 84h, 86h and second, upper ends of the holding arms 84h, 86h. In a holding position the holding arms 84h, 86h together form at their first, lower ends a holding region, in which the locking element 74h can be held in a form-fit manner. In their first, lower regions the holding arms 84h, 86h each comprise a hook that is oriented inwards. The locking element 74h has on its upper side, which faces away from the airplane seat element 14h, a holding region 88h, which is in an unlocking position coupled with the holding arms 84h, 86h in a form-fit manner. In the holding position the holding arms 84h, 86h are preferably oriented substantially parallel to one another (see FIG. 9). The holding unit 78h comprises a spring element 94h. The spring element 94h is configured for holding the holding arms 84h, 86h in their holding position. The spring element 94h is arranged in a lower region of the holding arms 84h, 86h, on a side of the holding arms 84h, 86h that faces towards the holding region. The spring element 94h is implemented as a tension spring element, which is configured to exert a spring force onto the holding arms 84h, 86h which pulls the holding arms 84h, 86h towards each other at their lower ends. The spring element 94h is preferentially embodied as a spiral spring.

The holding unit 78h is configured to release the locking element 74h in a release position. In the release position of the holding unit 78h, the locking element 74h can be brought from its unlocking position into its locking position, in which it locks the airplane seat element 14h embodied as a tray table and secures it in its stowage position. In order to reach the release position, the holding arms 84h, 86h are pivoted out of their holding position, in particular by upper ends of the holding arms 84h, 86h being moved towards each other and the lower ends, in which the holding arms 84h, 86h form the holding region, are moved apart from each other. This is effected in particular by the holding arms 84h, 86h being pivoted relative to each other via the bearing point 90h.

The functional unit 20h comprises one actuatable shape-memory element 22h, 24h per holding unit 78h, 80h. The actuatable shape-memory elements 22h, 24h are respectively configured for adjusting the corresponding holding unit 78h, 80h from its holding position into its release position. The actuatable shape-memory element 22h of the first holding unit 78h is configured to operate the holding arms 84h, 86h, in particular to pivot the holding arms 84h, 86h relative to each other. The shape-memory element 22h is in particular arranged at an upper end of the holding arms 84h, 86h. The shape-memory element 22h connects the holding arms 84h, 86h to each other in their upper ends. The shape-memory element 22h is configured such that it changes its shape, in particular shortens, when actuated, that is in particular when subjected to a current or when supplied with thermal energy. Preferably the shape-memory element 22h is in particular configured, in a state when subjected to a current, to move the upper ends of the holding arms 84h, 86h towards each other. The shape-memory element 22h is in particular configured to pivot the holding arms 84h, 86h against the spring force of the spring element 94h. As a result of the pivoting of the holding arms 84h, 86h brought about by the shape-memory element 22h, the holding region formed at the lower ends of the holding arms 84h, 86h opens and releases the locking element 74h. In this way the locking element 74h can be brought from its unlocking position into its locking position. Principally it is also conceivable that the holding unit 78h is implemented in another way deemed expedient by someone skilled in the art, and can be brought from the holding position into the release position by the shape-memory element 22h.

The holding unit 78h comprises an abutment element 92h. The abutment element 92h is configured such that the locking element 74h abuts on the abutment element 92h with its holding region 88h in the locking position. The abutment element 92h is in particular fixedly connected with the panel 12h. The abutment element 92h preferably comprises a support region which the locking element 74h is guided through with a partial region. It is conceivable that the support region is implemented by a through-hole which the locking element 74h is guided through. The holding unit 78h comprises a spring element 96h. The spring element 96h is configured to support a movement of the locking element 74h from its unlocking position into its locking position. The spring element 96h is mounted between the abutment element 92h and a lower end of the locking element 74h. The spring element 96h exerts a spring force onto the locking element 74h which acts downwards, toward the locking element 70h of the airplane seat element 14h that is embodied as a tray table. In a release position the spring element 96h presses the locking element 74h into the locking element 70h of the airplane seat element 14h. In this way in particular an especially quick locking is achievable in case of a crash. In the locking position, after the locking elements 74h, 76h are released by the corresponding holding unit 78h, 80h, they engage into the locking elements 70h, 72h of the airplane seat element 14h embodied as a tray table, locking said tray table securely on the backrest 32h (see FIG. 9).

The functional unit 20h comprises a control unit 98h for a controlling of the actuatable shape-memory elements 22h, 24h. The control unit 98h is configured for actuating the shape-memory elements 22h, 24h in an identified case of a crash and for thus transferring the holding units 78h, 80h from their holding position into their release position. A case of a crash is herein in particular to mean a situation in which an acceleration force that exceeds a maximum acceleration acting in a normal operation is exerted onto the aircraft seat or the backrest. For capturing a case of a crash, the functional unit 20h comprises a sensor element 100h, preferably in particular an acceleration sensor, whose sensor signals are processed by the control unit 98h. Principally it is also conceivable that the sensor element 100h is embodied as a different sensor element deemed expedient by someone skilled in the art, for example as a mechanical sensor element, as a tactile sensor element, as a strain gauge arranged in the airplane seat element 14h embodied as a tray table, or as a proximity sensor. The sensor element 10h is arranged in the backrest 32h. Principally it is also conceivable that the control unit 98h and/or the sensor element 100h are implemented centrally by an airplane control unit actuating a plurality of airplane seats at the same time. Principally it is also conceivable that the sensor element 100h is embodied as a battery-driven sensor element with a capacitor.

REFERENCE NUMERALS 10 airplane seat module
12 panel
14 airplane seat element
16 screen adjusting unit
18 operating unit
20 functional unit
22 shape-memory element
24 shape-memory element
26 shape-memory element
28 shape-memory element
30 adjustment element
32 backrest
34 locking unit
36 locking element
38 locking element
40 locking element
42 locking element
44 locking element
46 locking element
48 service opening
50 mounting unit
54 seat bottom
56 actuator element
58 locking element
60 armrest
62 tray table
64 operating element
66 stowage space
68 locking element
70 locking element
72 locking element
74 locking element
76 locking element
78 holding unit
80 holding unit
82 holding element
84 holding arm
86 holding arm
88 holding region
90 bearing point
92 abutment element
94 spring element
96 spring element
98 control unit
100 sensor element

The invention claimed is:
1. An airplane seat device with at least one functional unit that is configured at least for a locking, a controlling and/or a movement of at least one airplane seat element, wherein the functional unit comprises at least one actuatable shape-memory element, wherein the functional unit forms at least a portion of a screen adjusting unit, which is configured to adjust an orientation of an airplane seat element embodied as a screen following a user's operation, wherein the functional unit comprises a plurality of actuable shape-memory elements, wherein the plurality of actuable shape-memory elements each is responsive to different actuation and can have different lengths.

2. The airplane seat device according to claim 1, wherein the functional unit comprises at least one adjustment element, which is adjustable at least substantially by the at least one actuatable shape-memory element.

3. The airplane seat device according to claim 1, wherein the plurality of actuable shape-memory elements are arranged respectively in a corner region of a rectangular adjustment element.

4. The airplane seat device according to claim 1, wherein the screen adjusting unit is configured to adjust the inclination of the airplane seat element relative to a passenger seated on an airplane seat.

5. The airplane seat device according to claim 1, wherein the actuable shape-memory elements are realized as springs made of a shape-memory alloy.

6. The airplane seat device according to claim 1, wherein the actuable shape-memory elements are adapted to be separately actuable via an operating unit.

7. An airplane seat device with at least one functional unit that is configured at least for a locking of at least one airplane seat element, wherein the functional unit comprises a plurality of actuatable shape-memory elements, wherein the functional unit forms at least a portion of a locking unit, which is configured to unit lock an airplane seat element in a stowage position, wherein the functional unit comprises at least one locking element, which is traversable between at least two positions and which is adjustable at least substantially by the actuatable shape-memory elements, and the actuable shape-memory elements are configured for a locking of the airplane seat element which is embodied as a tray table.

8. The airplane seat device according to claim 7, wherein the actuatable shape-memory elements are embodied as a locking element which is configured, in at least one operation state, for blocking and/or locking another element which is a correspondingly implemented locking element.

9. The airplane seat device according to claim 7, comprising at least one operating unit, via which the actuatable shape-memory elements are actuatable and which comprises at least one operating element, which is embodied as a touch-free sensor.

10. The airplane seat device according to claim 7, wherein the functional unit is configured for locking the airplane seat element in case of a crash.

11. The airplane seat device according to claim 10, wherein the locking unit is embodied as a crash locking unit which is configured to provide, in case of a crash, an additional locking in addition to a normal locking of the airplane seat element.

12. The airplane seat device according to claim 7, wherein the locking unit is configured to for locking the airplane seat element that is embodied as a tray table.

13. An airplane seat device with at least one functional unit that is configured at least for a locking of at least one airplane seat element, wherein the functional unit comprises at least one actuatable shape-memory element, wherein the at least one functional unit is configured for locking the airplane seat element in case of a crash, and wherein the locking unit is embodied as a crash locking unit which is configured to provide, in case of a crash, an additional locking in addition to a normal locking of the airplane seat element.

14. The airplane seat device according to claim 2, the adjustment element having a first side and a second side which is opposite to the first side, wherein the airplane seat element is disposed on the first side of the adjustment element, and the at least one actuable shape-memory element is arranged on the second side of the adjustment element.

15. The airplane seat device according to claim 7, wherein the locking unit further comprises locking elements, which are controlled by the actuable shape-memory elements.

16. The airplane seat device according to claim 15, wherein the actuable shape-memory elements are configured for adjusting the locking elements between a locking position and an unlocking position.

* * * * *